United States Patent
Olivier

(10) Patent No.: US 11,483,166 B2
(45) Date of Patent: Oct. 25, 2022

(54) METHODS AND DEVICES FOR ENROLLING AND AUTHENTICATING A USER WITH A SERVICE

(71) Applicant: HIASECURE, Paris (FR)

(72) Inventor: Arnaud Olivier, Hong Kong (CN)

(73) Assignee: HIASECURE, Paris (FR)

( * ) Notice: Subject to any disclaimer, the term of this patent is extended or adjusted under 35 U.S.C. 154(b) by 97 days.

(21) Appl. No.: 16/766,872

(22) PCT Filed: Nov. 19, 2018

(86) PCT No.: PCT/FR2018/052902
§ 371 (c)(1),
(2) Date: May 26, 2020

(87) PCT Pub. No.: WO2019/102120
PCT Pub. Date: May 31, 2019

(65) Prior Publication Data
US 2020/0336317 A1    Oct. 22, 2020

(30) Foreign Application Priority Data

Nov. 24, 2017 (FR) .................................... 1761152

(51) Int. Cl.
*H04L 9/32*     (2006.01)
*H04L 9/08*     (2006.01)
*H04L 9/40*     (2022.01)

(52) U.S. Cl.
CPC ............ *H04L 9/3271* (2013.01); *H04L 9/085* (2013.01); *H04L 9/0869* (2013.01);
(Continued)

(58) Field of Classification Search
CPC ..... H04L 9/3271; H04L 9/085; H04L 9/0869; H04L 63/083; H04L 63/102; H04L 63/20
(Continued)

(56) References Cited

U.S. PATENT DOCUMENTS 9,881,054 B2 * 1/2018 Cao ...................... G06F 16/289
2014/0115670 A1   4/2014 Barton
(Continued)

FOREIGN PATENT DOCUMENTS

WO    2017/193165 A1    11/2017

OTHER PUBLICATIONS

Reimair et al., IEEE 2016 the 2nd IEEE Workshop on Security and Privacy in the Cloud, "Emulating U2F authenticator devices" (Year: 2016).*

(Continued)

*Primary Examiner* — Khalil Naghdali
(74) *Attorney, Agent, or Firm* — Nixon & Vanderhye

(57) ABSTRACT

The proposed authentication method is based on a secret convention between the service and the user. This convention is defined on the basis of a random choice of elementary algorithmic blocks from a collection of elementary algorithmic blocks during the enrolment phase of the user. During authentication, the user uses the convention by applying it to a challenge presented by the service in order to determine a response. The algorithmic blocks are chosen such that they can be memorised by the user. As a result of the diversity of these bricks and the combinatorics behind the conventions, the number of possible conventions is very high, making it virtually impossible for an attacker to guess the convention.

19 Claims, 6 Drawing Sheets

(52) U.S. Cl.
CPC .......... *H04L 63/083* (2013.01); *H04L 63/102* (2013.01); *H04L 63/20* (2013.01)

(58) Field of Classification Search
USPC .......................................................... 726/5
See application file for complete search history.

(56) References Cited

U.S. PATENT DOCUMENTS

| | | | |
|---|---|---|---|
| 2016/0134635 A1* | 5/2016 | Thelin .................. | H04L 63/101 726/28 |
| 2017/0149796 A1* | 5/2017 | Gvili .................... | H04L 9/0625 |

OTHER PUBLICATIONS

Gaikwad et al., 2016 IEEE International Conference on Advances in Electronics, Communication and Computer Technology (ICAECCT), "Forward Secure E-Auction with Auditing Integrity", pp. 399-406 (Year: 2016).*

International Search Report and Written Opinion, dated Mar. 11, 2019, from corresponding/related International Application No. PCT/FR2018/052902.

* cited by examiner

METHODS AND DEVICES FOR ENROLLING AND AUTHENTICATING A USER WITH A SERVICE

BACKGROUND OF THE INVENTION

Field of the Invention

The present invention relates to the field of enrollment and authentication methods and devices making it possible to implement them. These methods are typically used between a service provider and a user wishing to access the service. The most common use is to access a service implemented by a server and accessible to a user through a data network, for example the internet network, from a user terminal connected to this network.

Description of the Related Art

A first family of authentication methods is based on using a secret shared between the user and the service provider. The most common example is the password, which is well known. A user creates an account on the service and defines his password at that time. This is called an enrollment phase. When accessing the service, he provides his login and the associated password. The service then verifies that the password corresponds to the password registered by the service during the enrollment phase.

The limitations of this family of methods are well known. It is possible for an attacker to determine the password in different ways. For example the attacker can monitor communications and capture the password in order to then be able to assume the identity of the user with the service. Encryption of the exchanges makes it possible to combat these attacks to a certain extent. It is also possible to guess the password, either using personal data associated with the user, a technique known as social engineering, his date of birth, the name of his pet etc., or using password dictionaries. It is also possible to monitor the user at the moment when he enters his password into his terminal using a camera for example or also using spyware recording the use of the keys of the terminal keyboard.

Challenge-response techniques are also known. Some make it possible to combat monitoring of the exchange of the secret between the user and the service by avoiding transmission of the secret. The idea here is that the service generates a random challenge which it sends to the user. The user generates a response by applying a function to the challenge, this function using the shared secret. For example, it can be encryption of the challenge, the secret being used as encryption key. The service is able to carry out the same calculation and verify that the user's response corresponds to the encryption of the challenge using the shared secret. While these methods effectively make it possible to remove access to the shared secret by monitoring communications between the terminal and the server hosting the service, as the secret is no longer transmitted, they are of no use against social engineering, password dictionaries or also monitoring the user terminal.

A second family of authentication methods is based on a property intrinsic to the user. In this category are classified all of the biometric methods, such as iris, fingerprint, vein pattern, voice etc. recognition. These techniques have a certain level of reliability, but they also generally require the user terminal to be equipped with a recognition device suitable for the chosen technology, and are thus costly.

A third family of authentication methods is based on possession of an object: here the bearer of the object is authenticated. In an anecdotal manner for our part, in this category is classified the key-lock system, where access is authorized to the bearer of the key corresponding to the lock. Modern computer systems are based, for example, on having a telephone to which the service sends a code which the user must enter into his terminal. Thus it is ensured that the user is in possession of the telephone pre-registered by the service. It is also possible to use a device for pseudo-random generation of a code as in the systems known as single-use token-based authentication generators. In these systems, a token generator is used by the user, which triggers the generation of the token on request when he wants to authenticate himself. He then provides the requested token to the service. Using an identical algorithm, the service generates the corresponding token and verifies that the received token matches the requested token. These tokens are single use and thus do not allow the authentication sequence to be performed again if they are intercepted during transmission. Matching of the tokens ensures that the user is indeed the bearer of the registered token generator. Each token generator is programmed to generate a unique sequence of tokens. The user's bank card can also be used as an object of which it can be verified that the user is the bearer. This is the case, for example, when a service requests the card used for the purchase of a train or show ticket in order to issue your ticket. The main attack possible on these methods is the theft of the object of which the user is the bearer.

None of these methods is currently without shortcomings. They are not perfectly reliable. Their implementation and their management can prove to be complex and/or costly, as in the case of biometrics.

SUMMARY OF THE INVENTION

The aim of the present invention is to solve the above-mentioned drawbacks by proposing an original authentication method. The proposed authentication method is based on a secret convention between the service and the user. This convention is defined on the basis of a random choice of elementary algorithmic blocks from a collection of elementary blocks during the user enrollment phase. During authentication, the user uses the convention by applying it to a challenge presented by the service in order to determine a response. The algorithmic blocks are chosen so that they can be memorized by the user. As a result of the diversity of these blocks and the combinatorics behind the conventions, the number of possible conventions is very high, making it virtually impossible for an attacker to guess the convention. On the other hand, the user uses the memorized convention without having to enter it into his terminal: only the result of the application of the convention to the challenge is entered into the terminal. Because of this, all the techniques for monitoring the terminal are ineffective. It is virtually impossible to reconstruct the convention by capturing the challenge and the response. The system is thus extremely secure and simple to put in place.

The invention relates to a method for enrolling a user with a service using an authentication module executed on a server, characterized in that it comprises the following steps:
  determining a convention making it possible to calculate a response based on a challenge by random selection of a plurality of basic algorithmic blocks from a set of basic algorithmic blocks;
  transmitting the convention to a user terminal for presentation to the user;

registering the convention associated with a user identifier.

According to a particular embodiment, the method also comprises a step of adapting the convention.

According to a particular embodiment, the adaptation step comprises a step of:
  simplifying the initially determined convention by reducing the number of basic algorithmic blocks.

According to a particular embodiment, the adaptation step comprises a step of:
  complexifying the initially determined convention by increasing the number of basic algorithmic blocks.

According to a particular embodiment, the simplification or complexification step comprises randomly selecting basic algorithmic blocks to be removed from, respectively added to, the convention.

According to a particular embodiment, the simplification or complexification step comprises receiving the user's selection of basic algorithmic blocks to be removed from, respectively added to, the convention.

According to a particular embodiment, the method also comprises at least one step of testing the determined convention.

According to a particular embodiment, the test step comprises the following steps:
  generating a challenge compatible with the convention;
  transmitting the challenge to a user terminal;
  receiving a response to the challenge received from the user terminal;
  comparing the response received with a response calculated by applying the convention to the challenge generated.

According to a particular embodiment, the method also comprises a step of:
  simplifying the convention following one or more failures of the test step.

According to a particular embodiment, the method also comprises a step of:
  determining a new convention following one or more failures of the test step.

According to a particular embodiment, the basic algorithmic blocks comprise a first form that is intelligible to the user and a second form corresponding to a code that can be executed by an information processing device.

According to a particular embodiment, the registered convention associated with a user is also associated with a service identifier.

The invention also relates to a method for authenticating a user with a service using an authentication module executed on a server, characterized in that it comprises the following steps:
  obtaining a convention associated with the user making it possible to calculate a response on the basis of a challenge, said convention being composed of a plurality of basic algorithmic blocks comprised within a set of basic algorithmic blocks, said convention constituting a secret shared between the user and the authentication module;
  generating a challenge compatible with the convention;
  transmitting the challenge to a user terminal;
  receiving a response to the challenge received from the user terminal;
  comparing the response received with a response calculated by applying the convention to the challenge generated.

According to a particular embodiment, the challenge generated is different from all of the challenges previously generated for the same user.

According to a particular embodiment, the challenge is transmitted directly to the user terminal.

According to a particular embodiment, the challenge is transmitted to a service acting as a proxy between the server and the user terminal.

The invention also relates to an information processing device characterized in that it comprises a processor configured to execute an enrollment method according to the invention.

The invention also relates to an information processing device characterized in that it comprises a processor configured to execute an authentication method according to the invention.

The invention also relates to a computer program comprising instructions suitable for implementing each of the steps of the method according to the invention when said program is executed on a computer.

The invention also relates to an information storage means, removable or not, partially or totally readable by a computer or a microprocessor comprising code instructions of a computer program for executing each of the steps of the method according to the invention.

BRIEF DESCRIPTION OF THE DRAWINGS

Other features and advantages of the invention will also become apparent in the description below, with respect to the attached drawings, given by way of the following non-limitative examples.

DESCRIPTION OF THE PREFERRED EMBODIMENTS

Figure 1:
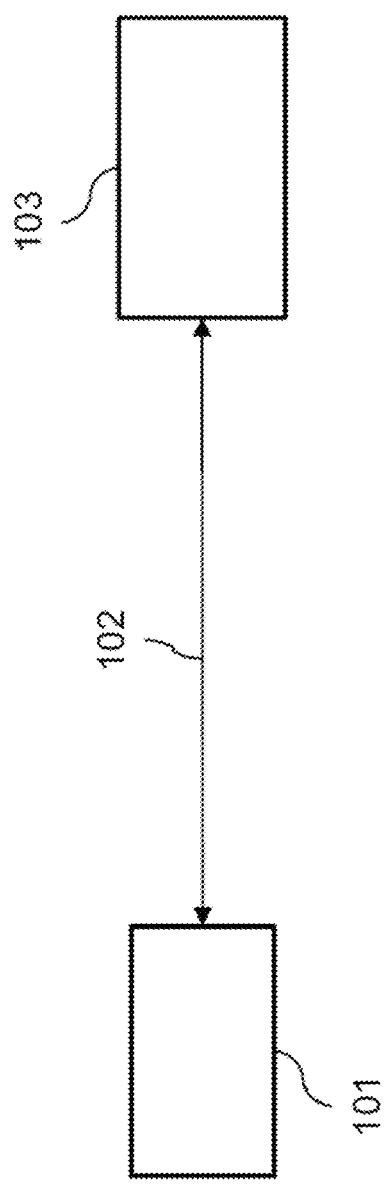
FIG. 1 illustrates a first example of a system making it possible to implement the invention.

FIG. 1 illustrates a first example of a system making it possible to implement the invention. In this system, a terminal 101 makes it possible for a user to connect to a service 103 hosted by one or more servers. The terminal 101 is connected to the service 103 by a data communication network, typically the internet. The connection between the terminal 101 and the service 103 using the communication network allows the exchange of messages 102 between the terminal and the service 103. These exchanges of messages follow an exchange protocol; it can typically be an HTTP (Hypertext Transport Protocol) used by web services, but any other protocol can also be used.

Figure 3:
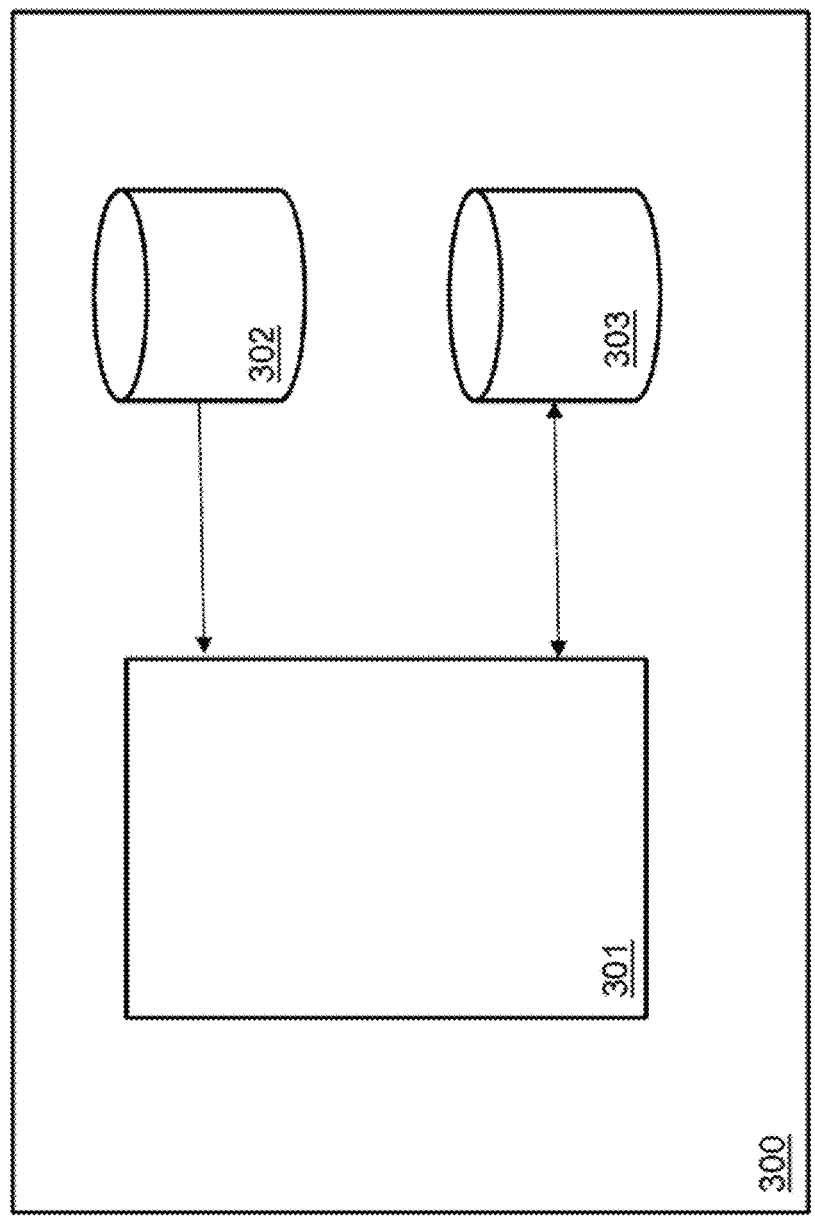
FIG. 3 illustrates an authentication module according to an embodiment example of the invention.

The service 103 hosts an authentication module, such as for example the authentication module illustrated in FIG. 3. This authentication module makes it possible to implement an enrollment method making it possible for a user of the terminal 101 to register himself with the service 103. An example of such an enrollment method is illustrated in FIG.

Figure 5:
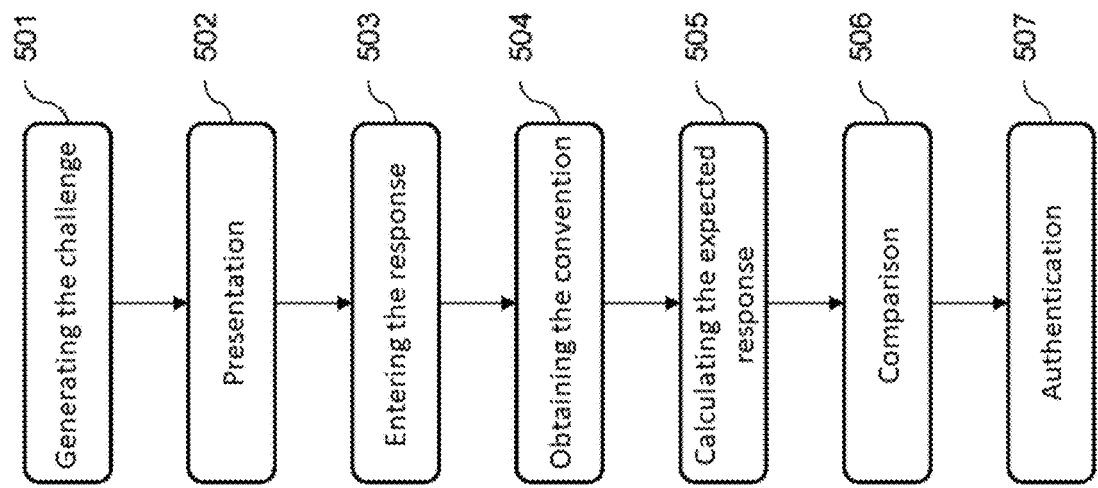
FIG. 5 illustrates an authentication procedure in an embodiment of the invention.

4. The authentication module also makes it possible to implement a method for authenticating a user of the terminal 101 previously enrolled with the service 103. FIG. 5 illustrates an example of such an authentication method.

The terminal 101 can be a personal computer, a tablet computer, a mobile telephone terminal or any type of terminal connected to a data communication network. The service 103 is typically implemented on one or more servers. These servers can be operated directly by the service provider or by a third party within a data center.

Figure 2:
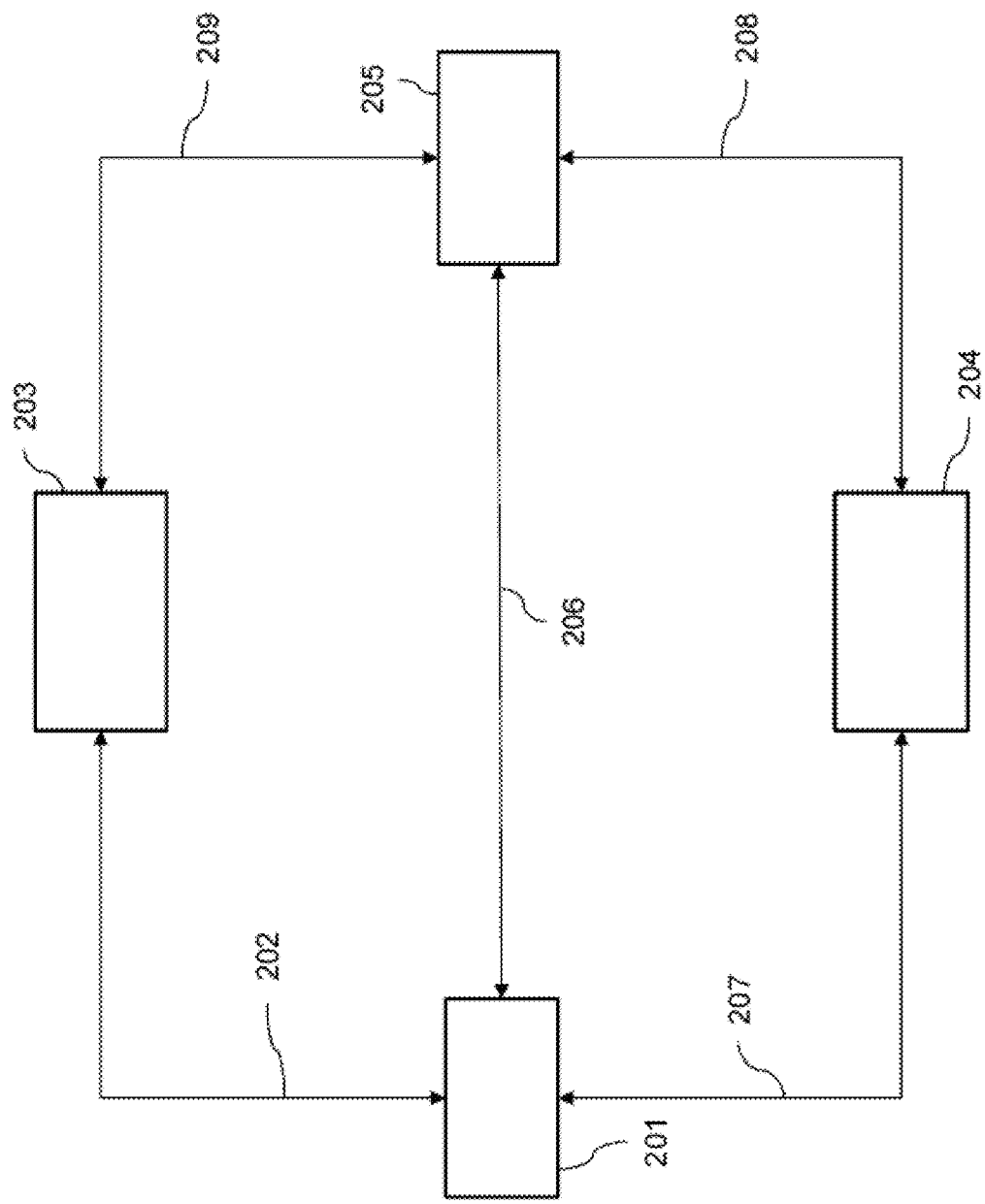
FIG. 2 illustrates a second example of a system making it possible to implement the invention.

FIG. 2 illustrates a second example of a system making it possible to implement the invention. In this second example, the terminal 201 makes it possible for a user to connect to several services including the two services 203 and 204 shown. The enrollment and authentication procedures are undertaken by an authentication server 205. This authentication server is typically controlled by an authentication third party to which the service providers controlling the services 203 and 204 have outsourced the authentication.

Two modes of operation can be envisaged. In a first mode of operation, called proxy operation, the terminal 201 only communicates with the services 203 and 204, which are the exchanges 202 and 207. The enrollment and authentication operations are then outsourced by the services 203 and 204 to the authentication server 205 through the exchanges 208 and 209. In this mode of operation, there are never direct exchanges 206 between the terminal 201 and the authentication server 205. In this mode of operation, the service intervenes as a proxy between the terminal and the authentication server.

In a second mode of operation, called direct operation, the service 203 or 204 which receives an enrollment or authentication request from a user terminal 201 initiates the corresponding operation with the authentication server 205. Then, the authentication server 205 carries out the enrollment or authentication operation by direct exchanges 206 with the terminal 201 and notifies the result of the operation to the service 203 or 204. Once the enrollment or the authentication has been carried out, the normal interactions between the terminal 201 and the service 203 or 204 can resume.

The system illustrated in FIG. 2 operates with two services 203 and 204, but it can extend, in a similar way, to any number of services. The two modes of operation described can also be mixed depending on the services. Some services can implement a proxy operation, while other services use direct operation.

In the system in FIG. 2, the authentication module of which an example is illustrated in FIG. 3 is implemented by the authentication server.

FIG. 3 illustrates an authentication module 300 according to an embodiment of the invention.

According to an aspect of the invention, the authentication is based on a secret shared between the user and the authentication module. Unlike in the prior art, the shared secret is not a static item of information, such as a password, but a convention. In this document, by "convention" is meant an algorithm making it possible to calculate a response based on a challenge. The challenge can take an unlimited number of forms. According to an embodiment example, the challenge consists of a list of numerals. But the challenge can be based on images, colors, symbols or any other item of data that can be interpreted by a human being.

In fact, the user must memorize the convention, i.e. the algorithm to be applied to the challenge. This algorithm is composed of a set of elementary operations, called basic algorithmic blocks. As the challenge is interpreted by a human being in order to apply the memorized convention thereto, it is possible to imagine multiple forms for communicating the challenge. Going back to the example of the sequence of numerals, this sequence can be communicated in the raw form of a sequence of numerals, but also in the form of an image which comprises a sequence of numerals, in the form of a sequence of images, each representing a numeral, a sequence of symbols, each symbol being associated with a numeral or also any other means, the only limit being that the user must be able to identify a sequence of numerals from the challenge which is transmitted to him.

According to some embodiments, different families of challenges are defined. A first family can again take up the example of the sequences of numerals. Another family can be based on geometric shapes. Another family can be based on colors, images, musical notes etc. If the system is based on several families of challenges, the algorithmic blocks making it possible to define the conventions will also be classified in corresponding families depending on the family of challenges that they are able to manipulate.

The enrollment method comprises the operation of defining a convention that will be memorized by the user and stored by the authentication module. This operation can comprise defining the corresponding family of challenges when the system comprises several families of challenges.

The authentication method will comprise the operation of choosing, preferably at random, a challenge to be presented to the user. The user then applies the convention that he has memorized to the challenge that is presented to him in order to calculate a response. This response is transmitted to the authentication module. The latter, which also has the convention defined for this user, calculates for its part the expected response. The authentication succeeds when the response produced by the user corresponds to the expected response as calculated by the authentication module on the basis of the convention stored by the module.

One of the advantages of the authentication method described in this way is that the shared secret, thus the convention, is never entered by the user into his terminal, unlike a password. It is therefore not possible for an attacker to obtain the secret by techniques for monitoring the terminal.

Another advantage of the authentication method described in this way is that the number of possible conventions increases exponentially with the number of basic algorithmic blocks used to define the conventions. This number also increases with the number of basic blocks used to define a given convention. The limit of this number is the ability of the user to memorize a large number of steps constituting the convention.

The authentication module 300 of the example in FIG. 3 comprises a first database 302 which comprises the basic algorithmic blocks. These basic algorithmic blocks can be assembled in any number whatever of blocks constituting an algorithm, i.e. a convention.

Advantageously, the basic algorithmic blocks are present in the database in two different forms. A first form is a text describing the operation in a manner that is intelligible to a user. This is the form that will be used to generate the version presented to the user. A second form corresponds to a computer code implementing the operation executable by a computer processor. This code can, for example, take the form of a computing function. This second form of basic algorithmic block is intended to be used by the authentication module in order to generate the executable version of the convention making it possible for it to calculate the response based on the challenge.

The authentication module 300 also comprises a second database 303 of users for storing the conventions defined during the enrollment phase. A convention stored in the database 303 is thus associated with a user. If the system makes it possible to manage several services, as in the system according to FIG. 2 for example, the convention can be associated with a user and a service. In this case, one and the same user will be associated with several conventions, one convention per service managed by the authentication module.

The authentication module 300 also comprises a control module 301 in charge of executing procedures for enrolling and authenticating a user for a service. It is also this control module that manages communications with the user terminal and/or the services according to the modes of implementation of the system.

The authentication module 300 can be comprised in an authentication server such as the server 205 in FIG. 2 in a system where the authentication is outsourced to an authentication third party. It can also be directly comprised within a service such as the service 103 in a system that does not outsource the authentication.

Figure 4:
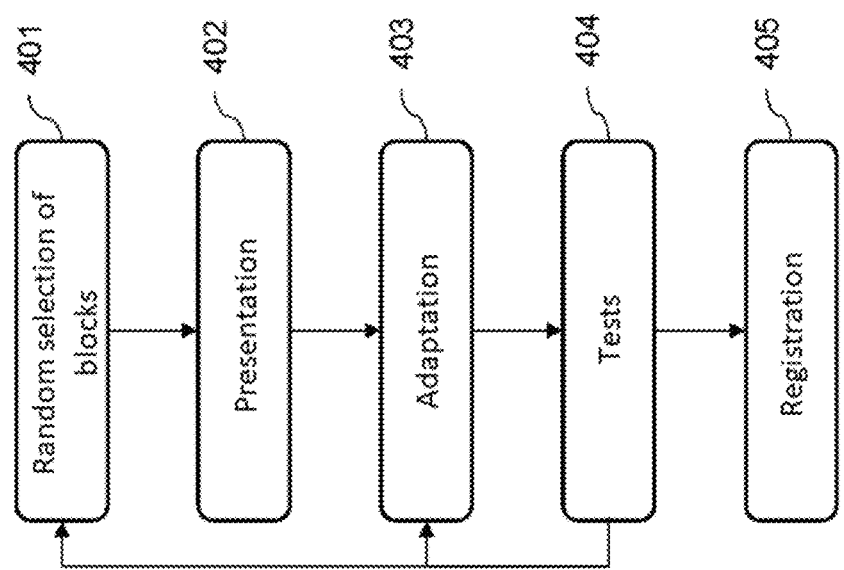
FIG. 4 illustrates an enrollment method according to an embodiment of the invention.

FIG. 4 illustrates an enrollment method according to an embodiment of the invention. This method can, for example, be implemented by the control module 301 of the authentication module in FIG. 3.

In a first step 401, an initial convention is constructed by a random drawing of basic algorithmic blocks from the database of basic algorithmic blocks. When the system manages several families of challenges, one family of challenges is also chosen, typically at random, and the selection of basic blocks operates in a subset of blocks compatible with the processing of the challenges of the chosen family.

At the end of this step, an initial convention is obtained, i.e. an algorithm composed of a succession of steps, the basic algorithmic blocks, making it possible to transform a challenge into a response.

The basic algorithmic blocks are typically elementary operations on the data constituting the challenges. However, they can advantageously also use items of contextual information associated with the user. These items of contextual information can relate to the location of the user using geolocation data. For example, the fact that the user is present in his home country or not. They can also relate to the terminal used, a mobile or a computer for example. They can also relate to an item of data associated with the transaction requiring authentication, for example the total of the transaction. They can also relate to the current time or also refer to an item of information related to a past transaction, thus to a transaction history.

In the following example, the challenge is of the sequence of numerals type. The basic algorithmic blocks comprise for example the following blocks:

Block 1: positioning on the numeral with the number N;
Block 2: reading towards the right;
Block 3: reading towards the left;
Block 4: reading N consecutive numerals;
Block 5: reading the value of the numeral and moving the corresponding number of numerals to the right;
Block 6: if I am in my home country;
Block 7: if I am not in my home country;
Block 8: if the value of the numeral is even;
Block 9: if the value of the numeral is odd;
Block 10: responding with the current result.

In this example, N represents a parameter of the basic algorithmic block. An example of a convention can then be composed of blocks 7, 1(6), 3, 4(4), 10, 6, 1(1), 5, 2, 4(4), 10, the numeral in brackets is the chosen value of the parameter N.

This convention, translated into simple language can read: if I am not in my home country then position on the 6th numeral, read 4 consecutive numerals towards the left; if I am in my home country then position on the first numeral, read the value of the numeral and move the corresponding number to the right, read 4 consecutive numerals towards the right; produce the result.

If the challenge is the following: 374289245663, then the response for a person in his home country is: 2892; if the person is not in his home country, the response is then: 9824.

During the step 402, the initial convention defined in this way is transmitted to the user terminal to be presented to the user. This transmission can be direct between the authentication module and the user terminal or passed on by the service. The user can then memorize the convention.

It may be the case that the user experiences difficulties in memorizing the convention or he wishes to increase the security of the method. In response to these problems, according to particular embodiments of the invention, an optional step 403 makes it possible to offer to adapt the initial convention selected for the user.

The adaptation offered typically comprises the possibility of simplifying the convention to facilitate memorization thereof or, on the other hand, of complexifying it in order to increase the level of security desired. In some embodiments, only one of these adaptations can be proposed. The adaptations can be carried out under the control of the user or under the control of the control module.

In the first case, for the simplification, the user is offered the possibility of selecting one or more basic algorithmic blocks in order to remove them from the convention. The resulting convention is thus simpler than the initial convention. Advantageously, the level of simplification can be limited by the system to avoid the resulting convention being too simple, which could weaken the security of the system. For example, a minimum number of basic algorithmic blocks can be required.

To complexify the convention, the user can be offered the possibility of selecting one or more basic algorithmic blocks from a list in order to add them to the convention. The manipulation can be carried out, for example, using drag-and-drop to insert a new block in the location of his choice. Thus the number of algorithmic steps of the convention increases along with its complexity. The possibility of guessing the convention by observing the challenge and the response reduces as much as the security of the solution increases.

In another embodiment, the simplification or complexification operations are carried out under the control of the control module. It is then this control module that selects the basic algorithmic block(s) to be removed from the convention for simplification. It is also the control module that selects new blocks and inserts them into the convention for its complexification.

Once satisfied, the user then validates the resulting convention.

It can be the case that a user misinterprets the convention. Advantageously, the method comprises an optional step 404 of testing the convention. During this step, the control module generates a challenge, typically in a random manner, and submits it to the user. The latter uses the convention to calculate a response and submits this response to the control module. The latter applies the convention to the challenge and produces its version of the response resulting from the application of the convention to the challenge. It then verifies that the user has indeed submitted the expected response as a function of the challenge and the convention. This test can be conducted for several challenges. If the user has indeed submitted the expected response, the convention is validated. In the opposite case, or in the presence of a significant error rate if several tests are carried out, it is proposed to return to a step 403 of adapting the convention. In some embodiments, for example if it is not desirable to simplify the convention, it is also possible to loop back to step 401 to select a new initial convention.

Once the convention has been validated, during a step 405, the convention is registered in the database 303 associated with the user identifier. In the systems where the authentication module manages the authentication of users for several services, the stored convention is associated with a user and the service in question. The convention can be stored in the form of a finalized algorithm or also in the form of a list of identifiers of the basic algorithmic blocks constituting the convention and any parameters of these basic blocks. The convention can then be determined by searching for the basic algorithmic blocks in the database 302.

The enrollment method is then finished.

FIG. 5 illustrates an authentication procedure in an embodiment of the invention. This authentication method typically takes place when a user wishes to connect to a service using his terminal. The terminal transmits the user identifier to the service. This identifier can correspond to an identifier entered by the user, for example of the login type. It can again be a unique identifier associated with the terminal such as the unique identifier used in mobile telephony and known as IMSI (International Mobile Subscriber Identity), which makes it possible to identify a registered user from the mobile telephone network. This identifier is stored in the SIM (Subscriber Identity Module) card of the telephone. The service then emits an authentication request to the authentication module comprising the user identifier. Advantageously, the request also comprises a service identifier associated with the service that emits the request. This service identifier is for example useful when the authentication is outsourced to an authentication third party which manages the authentication for several services.

During a first step 501, the control module of the authentication module generates a challenge for the user identified by his identifier. The challenge generated must be compatible with the convention associated with the user. In particular, when the system manages several families of challenges, the control module must verify which family of challenges is associated with the user in the database of users. The challenge is typically generated at random. Advantageously, the generation method ensures the uniqueness of the challenges. This means that it guarantees that a generated challenge is always different from all the challenges previously generated for this one and the same user.

During a step 502, the challenge generated is presented to the user. In a first embodiment, the service is used as a proxy for transmitting the challenge. The authentication module transmits the challenge to the service, which retransmits the challenge to the user terminal for display thereof. In another embodiment, the authentication module initiates a direct connection with the user terminal for direct transmission of the challenge. For example, transmission can be carried out in the form of a short text message of the SMS type or any other appropriate means of communication.

During a step 503, the user is invited to enter the response corresponding to the challenge using the convention that he has memorized. The user then enters his response into the terminal, which retransmits it to the authentication module, optionally via the service. Calculation of the response is carried out mentally by the user. The convention, which corresponds to the secret of the proposed method, is never expressed nor entered into the terminal, which makes observation thereof impossible.

During a step 504, which can occur at any moment in the method described, as the described order of the steps is not imperative, the control module of the authentication module obtains the convention associated with the user. Typically, the control module finds the convention associated with this user in the database of users. When several services are managed, the control module finds the convention associated with the user and with the service which initiated the authentication request. The convention can be found directly in the database of users or also generated from basic algorithmic blocks identified in the database of users and found in the database of basic algorithmic blocks. The authentication module then generates the executable version of the convention.

During a step 505, the control module of the authentication module applies the convention, in its executable version, to the challenge in order to determine an expected response. The parameters associated with the convention and stored in the database of users with the convention are used in the calculation. If there are any, the parameters based on items of contextual information are determined and used during execution of the convention. These items of contextual data, as previously described, can comprise the current time, the geographical location of the user, for example, or also items of information associated with the transaction history, which are then memorized, for example in the database of users.

During a step 506, the expected response calculated in this way and the response provided by the user are compared.

During step 507, the authentication proper is carried out depending on the result of the comparison in step 506. If the two responses correspond, the user is considered to be authenticated. If the two responses differ, the authentication fails. In an embodiment, a limited number of new attempts are proposed to the user if his authentication has failed. These new attempts can be based on the initial challenge or on a new challenge associated with each new attempt.

At the end of the authentication process, the authentication module typically notifies the service of the outcome of the authentication. The service can then give the user access depending on the result of the authentication.

Figure 6:
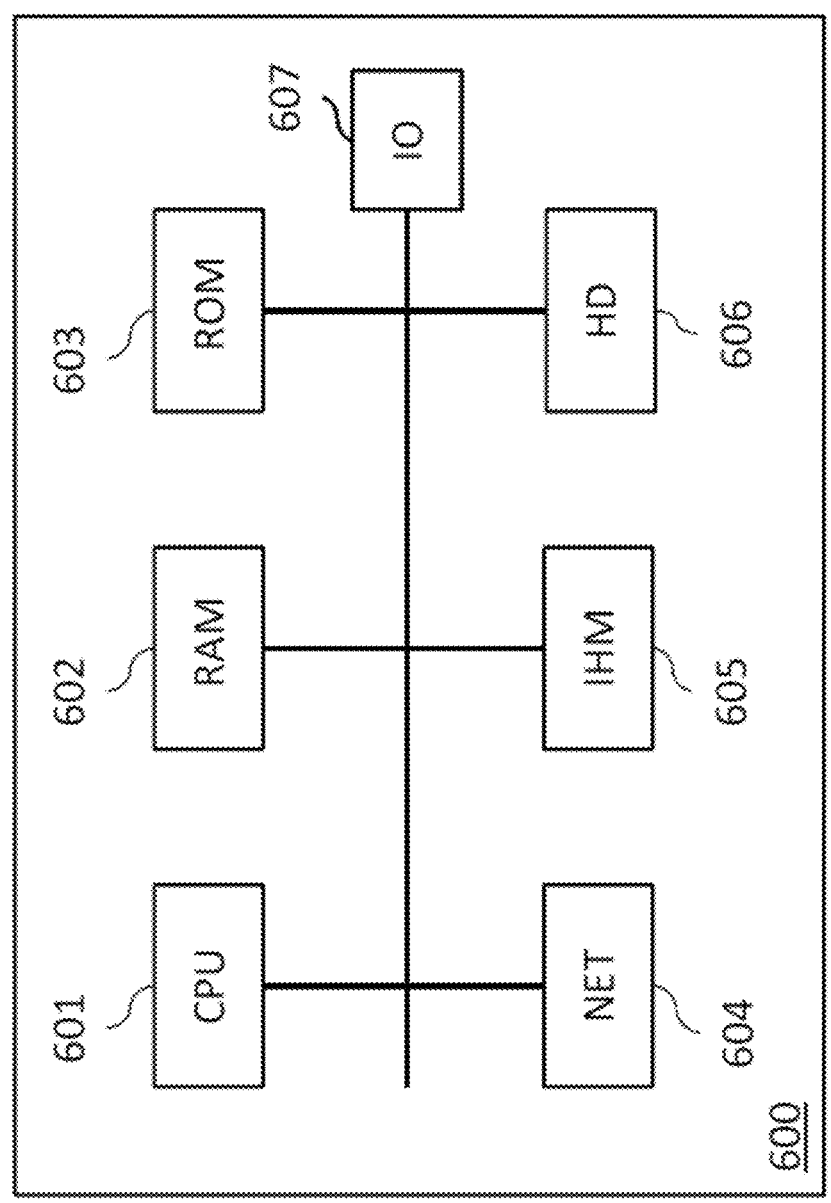
FIG. 6 is a diagrammatic block diagram of an information processing device for implementing one or more embodiments of the invention.

FIG. 6 is a diagrammatic block diagram of an information processing device 600 for implementing one or more embodiments of the invention. The information processing device 600 can be a peripheral such as a microcomputer, a workstation or a mobile telecommunication terminal. The device 600 comprises a communication bus connected to:

a central processing unit 601, such as a microprocessor, denoted CPU;

a random access memory 602, denoted RAM, for memorizing the executable code of the method for carrying out the invention as well as the registers suitable for registering variables and parameters necessary for implementing the method according to the embodiments of the invention; the storage capacity of the device can be supplemented with an optional RAM connected to an extension port, for example;

a read-only memory 603, denoted ROM, for storing computer programs for implementing embodiments of the invention;

a network interface 604 is normally connected to a communications network over which digital data to be processed are transmitted or received. The network interface 604 can be a single network interface, or composed of a set of different network interfaces (for example wired and wireless, interfaces or different types of wired or wireless interfaces). Data packets are sent over the network interface for the transmission or are read from the network interface for the receipt under the control of the software application executed in the processor 601;

a user interface 605 for receiving inputs from a user or for displaying information to a user;

a storage device 606 as described in the invention and denoted HD;

an input/output module 607 for receiving/sending data from/towards external peripherals such as a hard drive, removable storage medium or other.

The executable code can be stored in a read-only memory 603, on the storage device 606 or on a removable digital medium such as for example a disk. According to a variant, the executable code of the programs can be received by means of a communications network via the network interface 604, in order to be stored in one of the storage means of the communications device 600, such as the storage device 606, before being executed.

The central processing unit 601 is suitable for controlling and directing the execution of the instructions or portions of software code of the program or programs according to one of the embodiments of the invention, instructions which are stored in one of the above-mentioned storage means. Once powered up, the CPU 601 is able to execute instructions from the main RAM 602 with respect to a software application. Such software, when it is executed by the processor 601, causes the execution of the processes described.

In this embodiment, the apparatus is a programmable apparatus which uses software to implement the invention. However, by way of alternative, the present invention can be implemented in the hardware (for example in the form of a specific integrated circuit or ASIC).

Naturally, to satisfy specific needs, a person skilled in the art in the field of the invention could apply modifications to the above description.

Although the present invention has been described above with reference to specific embodiments, the present invention is not limited to the specific embodiments, and the modifications which can be found in the field of application of the present invention will be evident to a person skilled in the art.

The invention claimed is:

1. A method for enrolling a user with a service, comprising the following steps:
   determining, by an authentication module that executes on a server, a convention for calculating a response from a challenge by random selection of a plurality of basic algorithmic blocks from a set of basic algorithmic blocks stored on the server;
   transmitting, by the authentication module, the determined convention under a textual form to a user terminal for presentation to the user; and
   registering, by the authentication module, the determined convention by storing the convention in a database in communication with the authentication module and further updating the database to associate the convention with a user identifier identifying the user, the determined convention being under executable form to be used for authenticating the user to access the service.

2. The method according to claim 1, further comprising a step of:
   adapting the convention, via the authentication module, by simplifying an initially determined convention by reducing a number of the basic algorithmic blocks.

3. The method according to claim 1, further comprising a step of:
   adapting the convention, via the authentication module, by complexifying an initially determined convention by increasing a number of the basic algorithmic blocks.

4. The method according to claim 2, wherein the simplifying comprises randomly selecting basic algorithmic blocks to be removed from the convention.

5. The method according to claim 2, wherein the simplifying comprises receiving from the user a selection of basic algorithmic blocks to be removed from the convention.

6. The method according to claim 1, further comprising a step of:
   testing the determined convention.

7. The method according to claim 6, wherein the testing step comprises the following steps:
   generating, by the authentication module, a challenge, and transmitting the challenge to the user terminal;
   receiving, from the user terminal, a response to the challenge; and
   comparing, by the authentication module, the response received with a response calculated by applying the convention stored in the executable form to the generated challenge.

8. The method according to claim 6, further comprising a step of:
   simplifying, by the authentication module, the convention following one or more failures of the test step.

9. The method according to claim 6, further comprising a step of:
   determining, by the authentication module, a new convention following one or more failures of the testing step.

10. The method according to claim 1, wherein the registered convention associated with the user is also associated with a service identifier.

11. A method for authenticating a user with a service, comprising the following steps:
    obtaining, by an authentication module executed on a server, a convention, in an executable form and associated with the user for calculating a response to a challenge, said convention being composed of a plurality of basic algorithmic blocks comprised within a set of basic algorithmic blocks, said convention constituting a secret shared between the user and the authentication module;
    generating, by the authentication module, the challenge compatible with the convention, and transmitting the challenge to a user terminal;
    receiving, at the authentication module and from the user terminal, a response to the challenge; and
    authenticating, by the authentication module, the user when the response received from the user terminal matches a calculated response that is calculated at the authentication module by applying the convention to the generated challenge.

12. The method according to claim 11, wherein the challenge generated by the authentication module is different from all challenges previously generated for the user.

13. The method according to claim 11, wherein the challenge is transmitted directly to the user terminal.

14. The method according to claim 11, wherein the challenge is transmitted to a service that operates as a proxy between the server and the user terminal.

15. An information processing device for enrolling a user with a service, comprising a processor configured to perform the functions of:
- determining, by way of an authentication module executed by the processor of the information processing device, a convention to calculate a response from a challenge by random selection of a plurality of basic algorithmic blocks from a set of basic algorithmic blocks stored on the information processing device;
- transmitting, by way of the authentication module, the determined convention under a textual form to a user terminal for presentation to the user; and
- registering, by way of the authentication module, the determined convention associated with a user identifier identifying the user, the determined convention being under executable form and configured for authentifying the user to access the service.

16. An information processing device, comprising a processor configured to perform the functions of:
- obtaining, by way of an authentication module that executes on the information processing device, a convention that is associated with the user configured for calculating a response from a challenge, said convention being in an executable form and being composed of a plurality of basic algorithmic blocks comprised within a set of basic algorithmic blocks, said convention constituting a secret shared between the user and the authentication module;
- generating, by way of the authentication module, a challenge compatible with the convention, and transmitting the challenge to a user terminal;
- receiving, by way of the authentication module, a response to the challenge from the user terminal; and
- authenticating the user, by way of the authentication module, when the response received matches a calculated response that is calculated by way of the authentication module by applying the convention to the generated challenge.

17. A non-transitory computer-readable medium on which is stored a computer program comprising instructions that, upon execution by a processor of a computer device, causes the computer device to carry out each of the steps of the method according to claim 1.

18. The method according to claim 3, wherein the complexifying comprises randomly selecting basic algorithmic blocks to be added to the convention.

19. The method according to claim 3, wherein the complexifying comprises receiving from the user a selection of basic algorithmic blocks to be added to the convention.

* * * * *